(12) United States Patent
Callahan et al.

(10) Patent No.: US 8,987,612 B2
(45) Date of Patent: Mar. 24, 2015

(54) BUSHINGS, APPARATUSES INCLUDING BUSHINGS, AND ASSOCIATED METHODS

(71) Applicant: The Boeing Company, Seal Beach, CA (US)

(72) Inventors: Kevin S. Callahan, Shoreline, WA (US); Robert Earl Fisher, Everett, WA (US); Santiago Alvarado, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 13/685,524

(22) Filed: Nov. 26, 2012

(65) Prior Publication Data

US 2014/0145427 A1  May 29, 2014

(51) Int. Cl.
*H02G 3/00* (2006.01)
*F16L 5/00* (2006.01)
*B32B 37/14* (2006.01)
*F16B 5/02* (2006.01)
*F16B 1/00* (2006.01)

(52) U.S. Cl.
CPC . *F16L 5/00* (2013.01); *B32B 37/14* (2013.01); *F16B 5/0258* (2013.01); *F16B 5/0266* (2013.01); *F16B 2001/0064* (2013.01)
USPC ........................................................ 174/653

(58) Field of Classification Search
CPC ........................................................ H01B 7/00
See application file for complete search history.

(56) References Cited

U.S. PATENT DOCUMENTS

| 1,365,719 | A | | 1/1921 | Ogden |
| 2,257,538 | A | | 9/1941 | Schlueter |
| 2,430,737 | A | | 11/1947 | Roe |
| 2,520,375 | A | | 8/1950 | Roe |
| 2,653,334 | A | | 9/1953 | Bay |
| 3,031,212 | A | * | 4/1962 | Oliver .......................... 285/192 |
| 3,343,581 | A | * | 9/1967 | Martin et al. ................. 411/349 |
| 4,289,060 | A | | 9/1981 | Emmett |
| 4,789,285 | A | | 12/1988 | Fischer |
| 4,971,268 | A | * | 11/1990 | Dobrowski et al. ....... 244/135 R |
| 5,653,615 | A | * | 8/1997 | Inaba et al. .................... 439/827 |
| 5,683,215 | A | | 11/1997 | Gaignard et al. |
| 6,254,439 | B1 | * | 7/2001 | Endo et al. .................... 439/843 |
| 6,273,655 | B1 | | 8/2001 | McAlpine et al. |
| 6,629,808 | B1 | | 10/2003 | Martin et al. |
| 6,905,295 | B2 | | 6/2005 | Stevenson et al. |
| 7,115,003 | B2 | * | 10/2006 | Zhao et al. .................... 439/851 |
| 2007/0147971 | A1 | | 6/2007 | Jennings et al. |
| 2007/0187552 | A1 | * | 8/2007 | Tichborne et al. ........ 244/135 R |
| 2012/0152611 | A1 | | 6/2012 | Fisher et al. |

* cited by examiner

*Primary Examiner* — Timothy Thompson
*Assistant Examiner* — Krystal Robinson
(74) *Attorney, Agent, or Firm* — DASCENZO Intellectual Property Law, P.C.

(57) ABSTRACT

Bushings include a tubular body that defines a through-bore for receiving a fastener for mounting a component to an object. The tubular body includes end regions and a plurality of spring elements spaced circumferentially around the tubular body and extending longitudinally along the tubular body between the end regions. Also disclosed are apparatus that include bushings, such as aircraft, and associated methods of utilizing bushings and of manufacturing bushings.

18 Claims, 7 Drawing Sheets

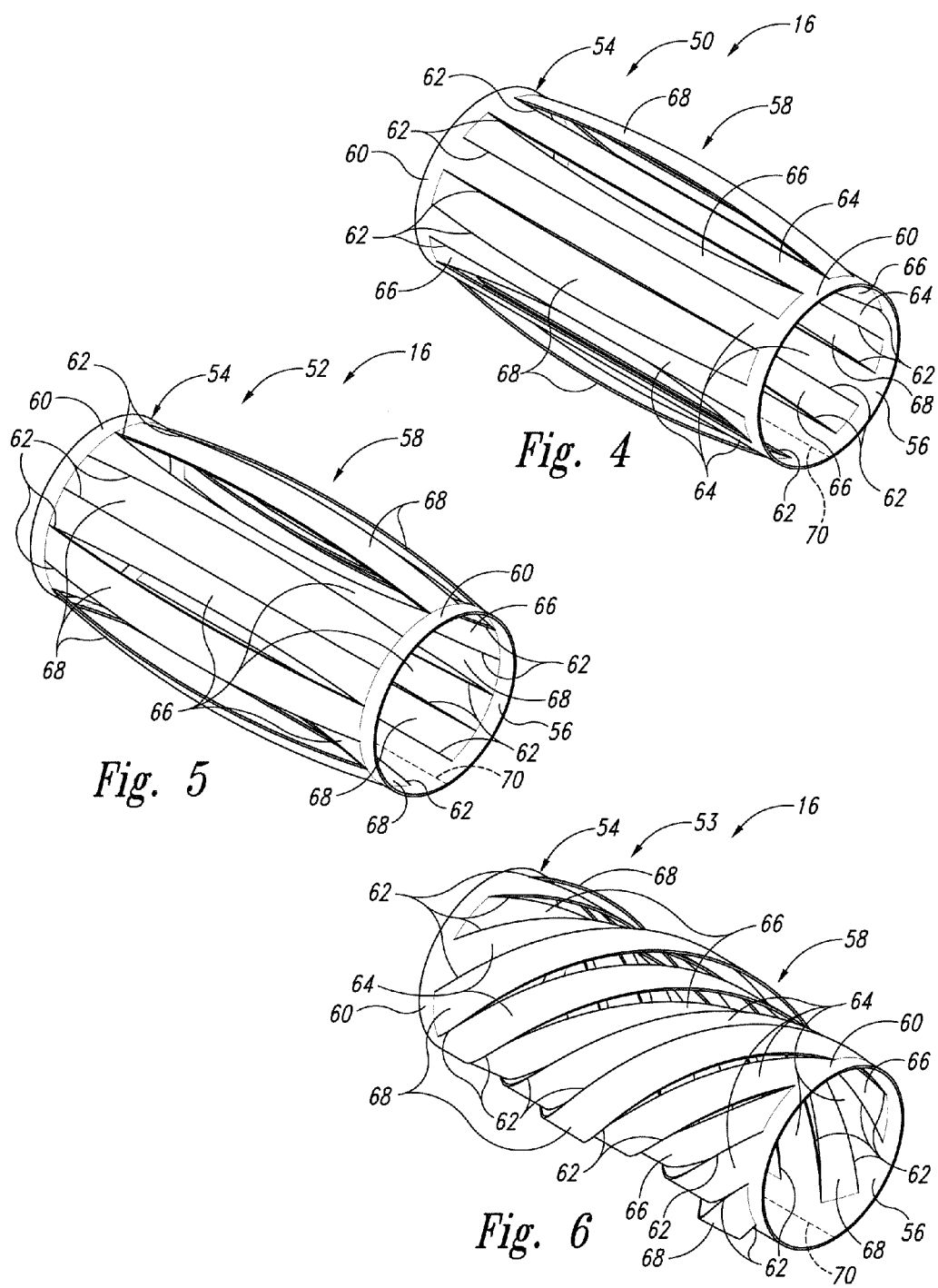

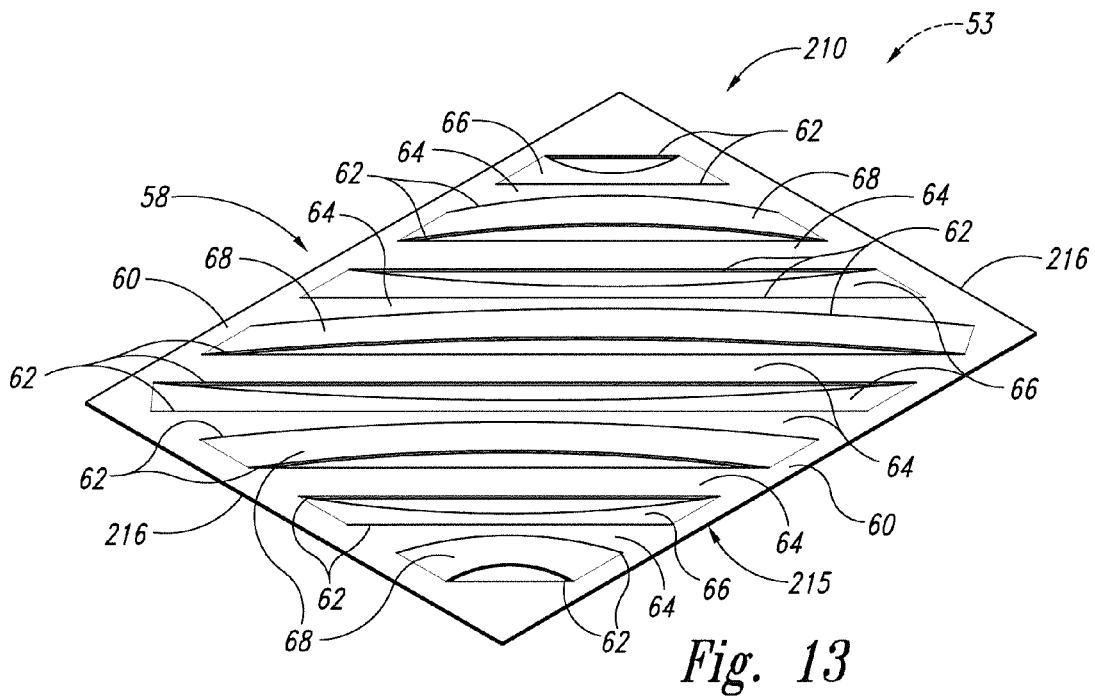

BUSHINGS, APPARATUSES INCLUDING BUSHINGS, AND ASSOCIATED METHODS

FIELD

The present disclosure relates generally to bushings and more specifically to electrically conductive bushings.

BACKGROUND

Bushings are used for a variety of purposes, and typically, a bushing is a hollow cylindrical component, such as a tube or sleeve, that may be used as a guide or spacer for various tools, fasteners, parts, etc. In some applications, a bushing may form a portion of a bearing assembly.

In the aerospace industry, one application for bushings includes ensuring that components that extend through the wall of a fuel tank are sufficiently and electrically grounded to the wall of the fuel tank, so as to avoid sparking. In modern aircraft construction, in which airframes, including fuel tanks, are constructed of carbon fiber reinforced polymers, and when utilizing existing bushing technology, the holes that extend through the wall of a fuel tank and the bushings themselves that are press-fit into the holes are required to have very tight tolerances with respect to each other to ensure proper engagement between, and thus grounding of, the bushings and the wall of the fuel tank.

The manufacturing costs associated with these tolerances are not insignificant.

SUMMARY

Bushings, apparatuses that include bushings, and associated methods are disclosed herein. Bushings according to the present disclosure are configured to be used in the mounting of a component to an object, such as by utilizing a fastener to operatively mount the component to the object. As an illustrative, non-exclusive example, a bushing may be used to operatively mount a hydraulic line to a fuel tank of an aircraft; however, other applications of bushings also are within the scope of the present disclosure.

Bushings according to the present disclosure include a tubular body that defines a through-bore for receiving a fastener for mounting a component to an object. The tubular body includes end regions and a plurality of spring elements spaced circumferentially around the tubular body and extending longitudinally along the tubular body between the end regions.

In some embodiments, the tubular body defines a through-bore for receiving a fastener for mounting a component to an object. In some embodiments, the tubular body is constructed of electrically conductive material that has a conductivity of at least 1×106 Siemens per meter. In some embodiments the tubular body includes end regions that extend for less than 30% of an overall length of the bushing, In some embodiments, the spring elements are spaced circumferentially around the tubular body and extend longitudinally along the tubular body between the end regions and are defined by strips that are contiguous with the end regions and that are not contiguous with circumferentially adjacent portions of the tubular body. In some embodiments, the spring elements include a subset of radially inwardly extending spring elements and a subset of radially outwardly extending spring elements. In some embodiments, the radially inwardly extending spring elements and the radially outwardly extending spring elements alternate circumferentially around the tubular body.

Some methods according to the present disclosure include positioning a bushing according to the present disclosure in a mounting hole of an object to which a component is to be mounted; positioning the component relative to the object to which the component is to be mounted; positioning a fastener through the mounting hole and the through-bore of the bushing; and fastening the component to the object, wherein the fastening includes longitudinally compressing the bushing.

Some methods according to the present disclosure include forming a plurality of spring elements in a blank of material and following the forming, wrapping the blank to form the tubular body of a bushing according to the present disclosure.

In some applications, a bushing according to the present disclosure may be used to ensure adequate grounding of a component that is mounted to an object.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 is an isometric view of an illustrative, non-exclusive example of a bushing according to the present disclosure.

FIG. 5 is an isometric view of another illustrative, non-exclusive example of a bushing according to the present disclosure.

FIG. 6 is an isometric view of another illustrative, non-exclusive example of a bushing according to the present disclosure.

FIG. 13 is an isometric view of a cut sheet metal blank that may be used to form an illustrative, non-exclusive example of a bushing according to the present disclosure.

FIG. 14 is a flowchart schematically representing illustrative, non-exclusive examples of manufacturing bushings according to the present disclosure.

DESCRIPTION

Bushings, apparatuses that include bushings, and associated methods are disclosed herein. Bushings according to the present disclosure are configured to be used in the mounting of a component to an object, such as by utilizing a fastener to operatively mount the component to the object. Examples of components, objects, and associated apparatuses discussed herein generally relate to aircraft; however, bushings and associated methods according to the present disclosure may relate to any suitable apparatuses, and the present disclosure is not limited to aerospace applications.

Figure 1:
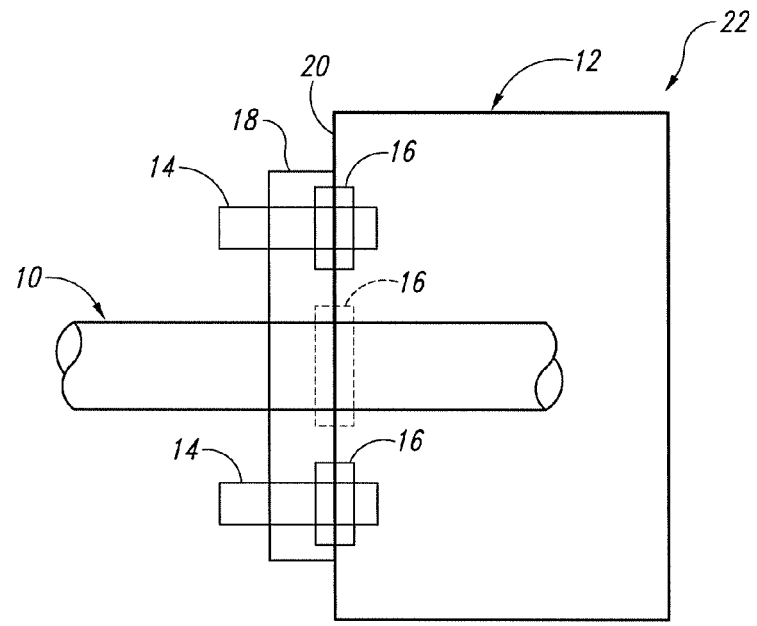
FIG. 1 is a diagram schematically representing a portion of an apparatus that includes bushings according to the present disclosure.

FIG. 1 schematically illustrates a generic component 10 mounted to a generic object 12 utilizing fasteners 14 and bushings 16 according to the present disclosure. In the schematic representation of FIG. 1, component 10 includes a mounting structure 18 that is engaged with a wall 20 of the object 12 and that provides structure for fasteners 14 to operatively mount the component 10, including the mounting structure 18 thereof, to the wall 20 of the object 12. As schematically illustrated in FIG. 1, fasteners 14 extend through the wall 20, and bushings 16 provide an interface between the fasteners 14 and the wall 20 of the object 12. As schematically and optionally illustrated in dashed lines in FIG. 1, a bushing 16 additionally or alternatively may be used to provide an interface between the component 10, itself, and the wall 20 of the object 12. The assembly of a component 10 and an object 12, including fasteners 14 and bushings 16, may comprise an apparatus 22, or at least a portion of an apparatus 22, as generally indicated in FIG. 1. FIG. 1 is schematic in nature and is intended solely to schematically and graphically illustrate the relative relationships between a component 10, an object 12, fasteners 14, and bushings 16 according to the present disclosure, and does not limit the present disclosure to a specific application of bushings 16 according to the present disclosure.

Bushings 16 are configured to provide a desired interface between a component 10 and/or fasteners 14 associated with the component 10, the mounting structure 18, and the wall 20 of an object 12. The desired interface may be based on any suitable criteria. As an illustrative, non-exclusive example, bushings 16 may be utilized to suitably and electrically ground the component 10 to the object 12, or otherwise ensure that the bushing 16 provides an electric current flow path between the component 10 and the object 12. Such a configuration may be desirable for a number of reasons. As an illustrative, non-exclusive example, the component 10 may be configured to carry an electric charge, and it may be desirable to prevent sparking at the interface of the component 10 and the object 12 or between the associated fasteners 14 and the object 12. In such an application, bushings 16 may be utilized to ensure that the interface between the component 10, the mounting structure 18, and/or associated fasteners 14 and the object 12 is tight, or free of voids, so as to increase the conductivity and decrease the resistivity of the interface, thereby decreasing the opportunity for a spark to form at the interface. Other applications also are within the scope of the present disclosure.

Figure 2:
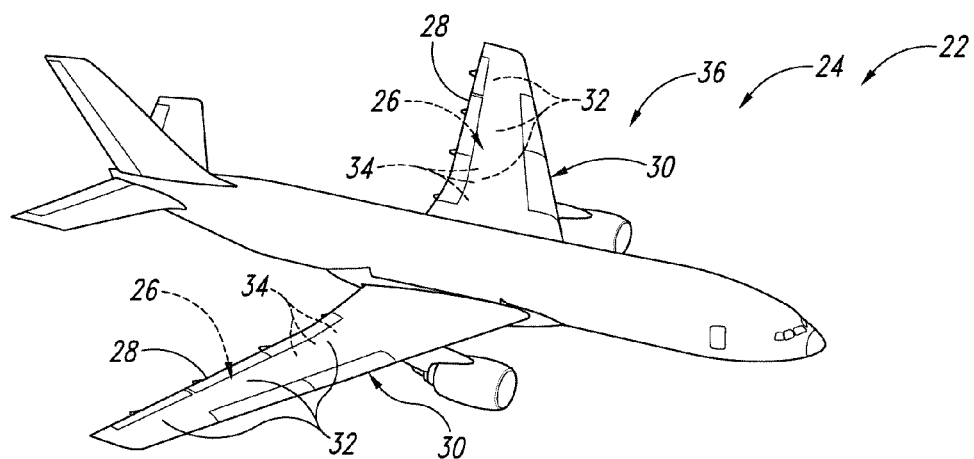
FIG. 2 is a perspective of an aircraft, representing an illustrative, non-exclusive example of an apparatus that includes bushings according to the present disclosure.

In FIG. 2, an illustrative, non-exclusive example of an apparatus 22 is illustrated in the form of an aircraft 24. The example aircraft 24 is in the form of a fixed wing aircraft; however, other types and configurations of aircraft also are within the scope of the present disclosure, including (but not limited to) helicopters and missiles. Additional non-exclusive examples of apparatuses that may utilize, or include, bushings 16 include (but are not limited to) spacecraft, land vehicles, marine vehicles, wind turbines, masts, outdoor antennas, any apparatus 22 requiring lightning protection, any apparatus 22 having a component 10 or fastener 14 that penetrates a wall 20 of an object 12, etc.

Aircraft 24 typically include hydraulic systems 26, such as to operate various components of the aircraft 24, including (but not limited to) flaps 28 and other movable portions of the wings 30. Moreover, aircraft 24 typically include one or more fuel tanks 32 within the wings 30 of the aircraft 24. Accordingly, in an effort to efficiently route the various hydraulic lines 34 associated with hydraulic systems 26 within the internal space constraints of the wings 30, the hydraulic lines 34 may penetrate and extend through the fuel tanks 32. Because hydraulic lines 34 typically are constructed of metallic materials and therefore are capable of carrying electrical charges, it may be important to prevent sparking at the interface between the hydraulic lines 34 and the fuel tanks 32. Moreover, because airframes 36 of modern aircraft 24, including the fuel tanks 32 thereof, may be constructed of composite fiber composite materials, the grounding of the hydraulic lines 34 to the fuel tanks 32 may require very tight connections to prevent against sparking. Accordingly, hydraulic lines 34 are examples of a component 10, and fuel tanks 32 are examples of an object 12.

Figure 3:
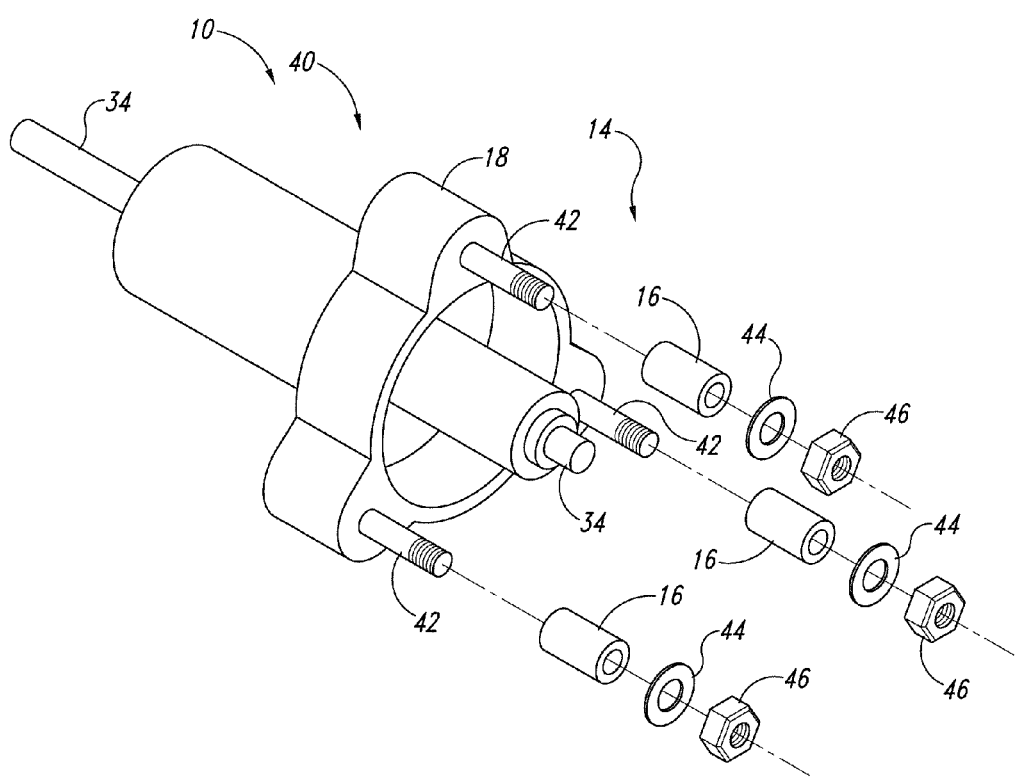
FIG. 3 is an isometric view of a bulkhead isolator for a hydraulic line, representing an illustrative, non-exclusive example of a component that may be installed utilizing bushings according to the present disclosure, illustrated together with associated fasteners and schematic representations of bushings according to the present disclosure.

FIG. 3 shows an illustrative, non-exclusive example of a component 10 in the form of a bulkhead isolator 40 for a hydraulic line 34 for mounting to a fuel tank 32 of an aircraft 24, together with associated fasteners 14 and schematic representations of bushings 16. The bulkhead isolator 40 additionally or alternatively may be described as, or may be an example of, a mounting structure 18 for a hydraulic line 34. In the aerospace industry, the term "bulkhead" typically is used to refer to walls that separate "liquid zones" from "dry zones," such as, for example, the walls of a fuel tank 32, but the present disclosure is not limited to utilizing bushings 16 with bulkhead isolators 40 associated with mounting a hydraulic line 34 to a fuel tank 32. In the illustrated example, the fasteners 14 include studs 42 that are integral with the body of the mounting structure 18, washers 44, and nuts 46; however, other configurations of fasteners 14 are within the scope of the present disclosure, including the use of bolts that extend through mounting structure 18, the use of non-threaded fasteners, etc.

Other applications within aircraft, within the aerospace industry, as well as applications outside of the aerospace industry also are within the scope of the present disclosure, including applications in which the object 12 is not constructed of fiber reinforced composite material, applications in which the component 10 or associated mounting structure 18 is not constructed of a metallic material, and/or applications that do not relate to the prevention of sparking at the interface between a component 10 and an object 12.

Turning now to FIGS. 4-6, illustrative non-exclusive examples of bushings 16 are illustrated. The examples of FIGS. 4-6 are non-exclusive and do not limit the present disclosure to the illustrated embodiments. That is, bushings 16 are not limited to the specific embodiments illustrated in FIGS. 4-6, and bushings 16 may incorporate any number of the various aspects, configurations, characteristics, properties, etc. of bushings 16 that are illustrated and discussed herein, as well as variations thereof, without requiring the inclusion of all such aspects, configurations, characteristics, properties, etc. For clarity, the example bushing 16 illustrated in FIG. 4 is indicated as bushing 50, the example bushing 16 illustrated in FIG. 5 is indicated as bushing 52, and the example bushing illustrated in FIG. 6 is indicated as bushing 53.

As seen in FIGS. 4-6, bushings 16, including bushing 50, bushing 52, and bushing 53, include a tubular body 54 that defines a through-bore 56 and that includes a plurality of spring elements 58 that are spaced circumferentially around the tubular body 54 and that extend longitudinally along the tubular body 54 between opposed end regions 60 of the tubular body. The spring elements 58 of bushing 50 and bushing 52 extend parallel to the respective bushing's longitudinal axis, whereas the spring elements 58 of bushing 53 extend transverse, or at an angle, to the bushing's longitudinal axis. Additionally or alternatively, the spring elements 58 of bushing 53 may be described as being spiraled, or as spiraling around the bushing 53. The through-bore 56 is sized to receive a corresponding fastener 14 for mounting a component 10 to an object 12.

In some embodiments, each end region 60 may extend for less than 30, 20, 10, or 5% of an overall length of the bushing 16. Additionally or alternatively, the spring elements 58 may extend for at least 70, 80, 90, or 95% of the overall length of the bushing 16. Other relative lengths of end regions 60 and spring elements 58 also are within the scope of the present disclosure.

In some embodiments, the spring elements 58 may be defined by strips of material that are contiguous with the end regions 60 and that are not contiguous with circumferentially adjacent portions of the tubular body 54. Additionally or alternatively, the tubular body 54 may be described as defining a plurality of longitudinal slits 62 that are spaced apart circumferentially around the tubular body and with adjacent pairs of the spaced apart longitudinal slits 62 defining the spring elements 58. In some embodiments, spring elements 58 additionally or alternatively may be described as leaf spring elements 58.

In some embodiments of bushings 16, the spring elements 58 may be spaced apart from each other circumferentially around the tubular body 54. Bushing 50 of FIG. 4 is an example of such a bushing 16, and as seen in FIG. 4, the adjacent pairs of spring elements 58 are separated by strips of material 64 that extend between the end regions 60 of the tubular body 54. Bushing 53 of FIG. 6 also is an example of such a bushing 16, with strips of material 64 separating adjacent pairs of spring elements 58. Bushing 52 of FIG. 5, however, is an example of a bushing 16, in which adjacent pairs of spring elements 58 are not separated by strips of material 64. Other configurations also are within the scope of the present disclosure, including bushings 16 having spiral spring elements 58, as in bushing 53, but with adjacent pairs of spring elements 58 being separate by strips of material 64, as in bushing 50.

In some embodiments of bushings 16, the plurality of spring elements 58 may include a plurality of radially inwardly extending spring elements 66. Additionally or alternatively, in some embodiments of bushings 16, the plurality of spring elements 58 may include a plurality of radially outwardly extending spring elements 68. In the examples of FIGS. 4-6, bushing 50, bushing 52, and bushing 53 include radially inwardly extending spring elements 66 and radially outwardly extending spring elements 68. Moreover, in the examples of bushings 50, 52, and 53 the radially inwardly extending spring elements 66 and the radially outwardly extending spring elements 68 alternate circumferentially around the tubular body 54 of the bushing 16. However, such configurations are not required to all embodiments of bushings 16 according to the present disclosure, and it is within the scope of the present disclosure that a bushing 16 may include only radially inwardly extending spring elements 66 or only radially outwardly extending spring elements 68. Moreover, a bushing 16 may include both radially inwardly extending spring elements 66 and radially outwardly extending spring elements 68 that do not alternate circumferentially around the tubular body 54.

Additionally or alternatively, the radially inwardly extending spring elements 66 may be described as bowing radially inwardly. Additionally or alternatively, the radially inwardly extending spring elements 66 may be described as being concave with respect to an outer side of the bushing 16. Additionally or alternatively, the radially outwardly extending spring elements 68 may be described as bowing radially outwardly. Additionally or alternatively, the radially outwardly extending spring elements 68 may be described as convex with respect to an outer side of the bushing 16.

Bushings 16 may be constructed in any suitable manner of any suitable material, utilizing any suitable process, for example, depending on the application in which a bushing 16 is to be utilized. In some embodiments, the tubular body 54 may be constructed of a single monolithic piece of material. Bushings 50, 52, and 53 are examples of such bushings 16. In some such embodiments, the tubular body 54 may define a longitudinal seam 70, such as schematically and optionally illustrated in dashed lines in FIGS. 4-5 with respect to busing 50 and bushing 52. When present, the seam 70 may be a result of the forming process, examples of which are discussed herein. In some embodiments, the seam 70 may not be joined together. In other embodiments, the seam 70 may be joined together, such as by a brazing process and/or by a crimping process. In some embodiments, the tubular body 54 may be constructed of a cut length of tubing, including a seamless length of tubing.

Illustrative, non-exclusive examples of suitable materials from which bushings 16 may be constructed include electrically conductive materials, such as materials that have a conductivity of at least $1 \times 10^6$ Siemens per meter, examples of which include (but are not limited to) brass alloys and copper alloys, such as beryllium copper. Additionally or alternatively, the tubular body 54 of a bushing 16 may be plated, such as gold plated, nickel plated, and/or zinc plated. Other materials also are within the scope of the present disclosure.

Figure 7:
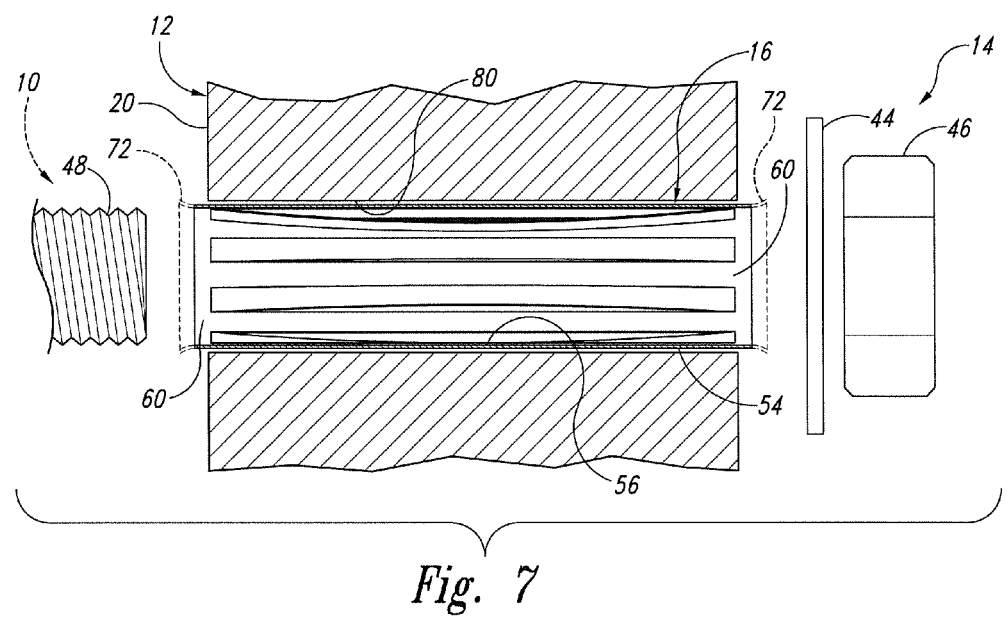
FIG. 7 is a fragmentary partially cross-sectional exploded side view illustrating a bushing according to the present disclosure in an uncompressed configuration, together with associated fasteners and an object to which a component may be mounted utilizing bushings according to the present disclosure.
Figure 8:
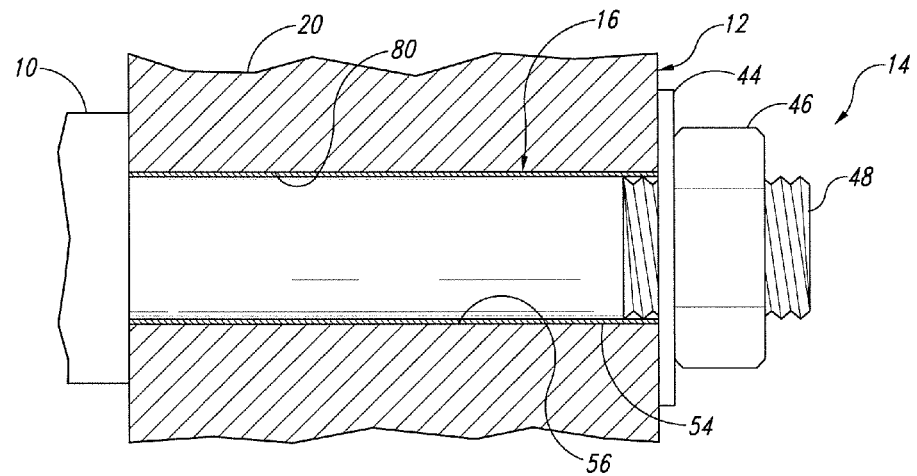
FIG. 8 is a fragmentary partially cross-sectional side view illustrating a bushing according to the present disclosure in a compressed configuration, together with associated fasteners and an object to which a component may be mounted utilizing bushings according to the present disclosure.

FIGS. 7-8 somewhat schematically represent illustrative, non-exclusive examples of bushings 16 together with a component 10, an object 12, and associated fasteners 14. Bushing 16 and object 12 are schematically illustrated in cross-section, and component 10 and the associated fasteners 14 are not illustrated in cross-section. In the illustrated example, fasteners 14 include a washer 44, a nut 46, and a threaded shaft 48. The threaded shaft 48 may be a stud 42 or it may be a separate bolt, and as mentioned, other configurations of fasteners 14 are within the scope of the present disclosure. FIG. 7 schematically illustrates a bushing 16 in an uncompressed configuration, and FIG. 8 schematically illustrates a bushing 16 in a compressed configuration.

As illustrated in FIGS. 7-8, bushings 16 are sized (and intended) to be inserted into a mounting hole 80 that extends through and is defined by the wall 20 of the object 12. Typically, the tubular body 54 of the bushing 16 has an outer diameter (or diameters) that is at least approximately equal to a diameter of the mounting hole 80 into which the bushing 16 is to be inserted. Because a bushing 16 may include radially outwardly extending spring elements 68, the tubular body 54 may not have a uniform outer diameter. In some embodiments, the outer diameter generally defined by the end regions 60 may be equal to, or at least approximately equal to, the diameter of the mounting hole 80 into which the bushing 16 is to be inserted.

Bushings 16 are configured to be longitudinally compressed by fasteners 14, such as between a washer 44 and a component 10. Accordingly, the tubular body 54 of a bushing may be described as having an uncompressed longitudinal length that is longer than a length, or depth, of the mounting hole 80, into which the bushing 16 is to be inserted, and a compressed longitudinal length that is equal to, or at least approximately equal to, the length, or depth, of the mounting hole 80, into which the bushing 16 is to be inserted. The longitudinal compressive force applied to the tubular body 54 when installed may be described as an installation force. Tubular bodies 54 may be configured to be compressed various amounts, depending on the application of the bushing 16 and such factors as the construction of the bushing 16. As an illustrative, non-exclusive example, the longitudinal length of the tubular body 54 when compressed may be in the range of 0.1-10% of the longitudinal length of the tubular body 54 when not compressed.

Bushings 16 may be sized for any suitable application. As illustrative, non-exclusive examples, the end regions 60 of the tubular body 54 may have outer diameters in the range of 3-100, 3-50, 3-30, 3-15, 3-10, or 3-5 mm; however, other sizes outside of the enumerated ranges also are within the scope of the present disclosure. Accordingly, bushings 16 may be configured and intended to be used with and inserted into mounting holes 80 having similar diameters. Additionally or alternatively, the tubular body 54 may have a longitudinal length, when compressed, in the range of 3-100, 3-50, 3-30, 3-15, 3-10, or 3-5 mm, such as to correspond with a mounting hole 80 having a similar length, or depth. Other sizes outside of the enumerated ranges also are within the scope of the present disclosure. Illustrative, non-exclusive examples of suitable wall thicknesses of the tubular body include thicknesses in the range of 0.1-3 mm; however, other thicknesses outside of this range also are within the scope of the present disclosure.

When operatively installed and compressed within a mounting hole 80, such as schematically represented in FIG. 8, the spring elements 58 may impart radial pressures on a fastener 14, such as the threaded shaft 48 of FIGS. 7-8, and/or on the wall 20 of the object 12. For example, radially inwardly extending spring elements 66, when included in a bushing 16, will impart an inward radial pressure on the fastener 14 that extends through the through-bore 56 of the tubular body 54. Radially outwardly extending spring elements 68, when included in a bushing 16, will impart an outward radial pressure on the wall 20 of the object 12. In some embodiments, when installed the interface between the tubular body 54 and the wall 20 of the object and the interface between the tubular body 54 and the fastener 14 that extends through the through-bore of the tubular body 54 may be configured to prevent sparking between the fastener 14 and the object 12. Additionally or alternatively, when installed the interface between the tubular body 54 and the wall 20 of the object and the interface between the tubular body 54 and the fastener 14 that extends through the through-bore of the tubular body 54 generally may be free of voids, or at least substantially free of voids.

In some embodiments of bushings 16, although not required, one or both of the end regions 60 may be flared out at the terminal end thereof, such as optionally illustrated in dashed lines in FIG. 7 at 72. Such a configuration may be desirable in some applications, such as when a fastener 14 in the form of a bolt has a radius, or fillet, at the interface between the shaft of the bolt and the head of the bolt.

Figures 9, 10:
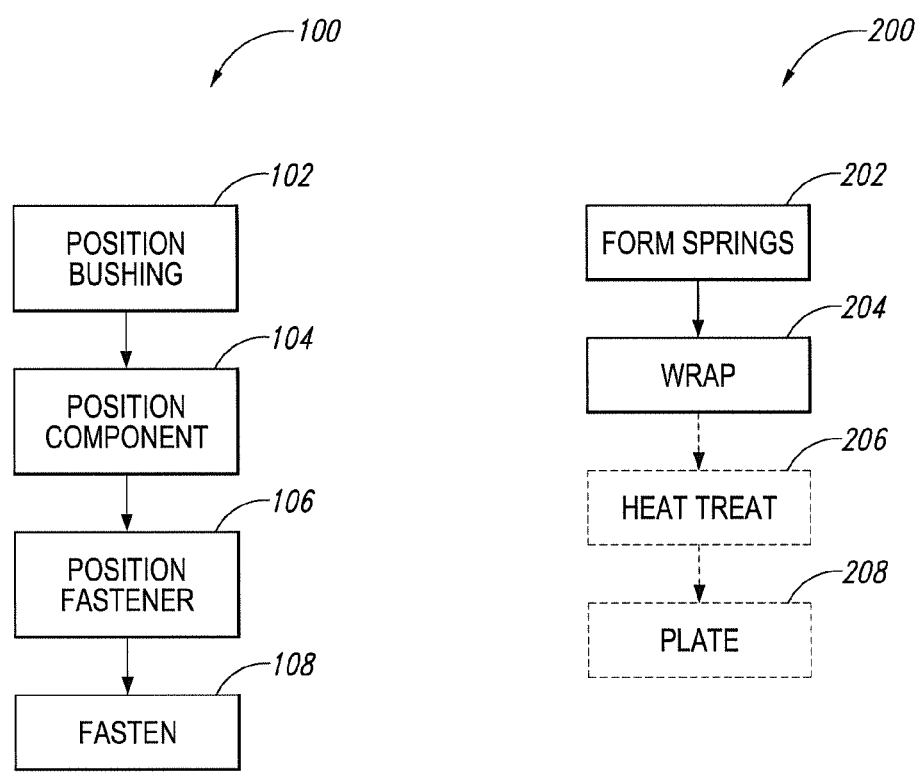
FIG. 9 is a flowchart schematically representing illustrative, non-exclusive examples of utilizing bushings according to the present disclosure.
FIG. 10 is a flowchart schematically representing illustrative, non-exclusive examples of manufacturing bushings according to the present disclosure.

FIG. 9 provides a flowchart that represents illustrative, non-exclusive examples of methods 100 for utilizing bushings 16 according to the present disclosure. The methods and steps illustrated in FIG. 9 are not limiting and other methods and steps are within the scope of the present disclosure, including methods having greater than or fewer than the number of steps illustrated, as understood from the discussions herein.

As schematically illustrated in FIG. 9, methods 100 include positioning the bushing 16 in a mounting hole 80 of an object 12 to which a component 10 is to be mounted, as schematically indicated at 102, positioning the component 10 relative to the object 12 to which the component 10 is to be mounted, as schematically indicated at 104, positioning a fastener 14 through the mounting hole 80 and the through-bore 56 of the bushing 16, as schematically indicated at 106, and fastening the component 10 to the object 12, as schematically indicated at 108. Any suitable order of these steps may be performed, and methods 100 are not limited to performance of the steps in the illustrated order of FIG. 9. For example, in some applications, it may be desirable, or suitable, to position the bushing 16 onto the fastener 14, and then position both of the bushing 16 and the fastener 14 relative to the object 12. Additionally or alternatively, in applications in which the fastener 14 is integral to the component 10, such as in the form of a stud 42, as in the example of FIG. 3, the positioning 104 of the component and the positioning 106 of the fastener may be performed simultaneously.

In some methods 100, the fastening 108 includes longitudinally compressing the bushing 16. In some methods 100, prior to the fastening 108, the bushing 16 has a longitudinal length that is greater than a length of the mounting hole 80, and following the fastening 108, the length of the bushing 16 is equal to, or is approximately equal to, the length of the mounting hole 80.

In some methods 100, such as depending on the construction of the bushing 16 and/or on the interface between the bushing 16 and the mounting hole 80, the fastening 108 may include applying an outward radial pressure by radially outwardly extending spring elements 68 against the wall 20 of the object 12. In some methods 100, the fastening 108 may include applying an inward radial pressure by radially inwardly extending spring elements 66 against the fastener 14 that extends through the through-bore 56 of the tubular body 54. In some methods 100, the fastening 108 may include operatively engaging the wall 20 of the object 12 and the fastener 14 that extends through the through-bore 56 with the tubular body 54 of the bushing 16.

In some methods 100, following the fastening 108, the fastener 14 may be grounded electrically to the object 12 through the bushing 16. In some methods 100, following the fastening 108, the component 10 is grounded electrically to the object 12 through the fastener 14 and the bushing 16.

In some methods 100, following the fastening 108, the interface between the bushing 16 and the fastener 14 and the interface between the bushing 16 and the object 10 are configured to prevent sparking between the fastener 14, the bushing 16, and the object 10 when the fastener 14 carries an electrical charge.

As discussed, bushings 16 may be used in a variety of applications. As an illustrative, non-exclusive example, in methods 100, the object 10 may include a tank for holding liquid, such as a fuel tank, including a fuel tank 32 of an aircraft 24. In some methods 100, the object 12 may be constructed of fiber reinforced composite material. In some methods 100, the component 10 may be configured to carry an electrical charge and the bushing 16 may be configured to ground the component 10 to the object 12. In some methods 100, the component 10 may include a bulkhead isolator 40 for a hydraulic line 34.

FIG. 10 provides a flowchart that represents illustrative, non-exclusive examples of methods 200 of manufacturing bushings 16 according to the present disclosure. The methods and steps illustrated in FIG. 10 are not limiting and other methods and steps are within the scope of the present disclosure, including methods having greater than or fewer than the number of steps illustrated, as understood from the discussions herein.

As schematically illustrated in FIG. 10, methods 200 include forming a plurality of spring elements 58 in a blank 210 of material, as schematically indicated at 202, and following the forming 202, wrapping the blank to form a tubular body 54, as schematically indicated at 204. As schematically and optionally illustrated in dashed boxed in FIG. 10, following the wrapping 204, some methods 200 additionally may include heat treating the tubular body 54, as schematically indicated at 206, and plating the tubular body 54, as schematically indicated at 208.

Figure 11:
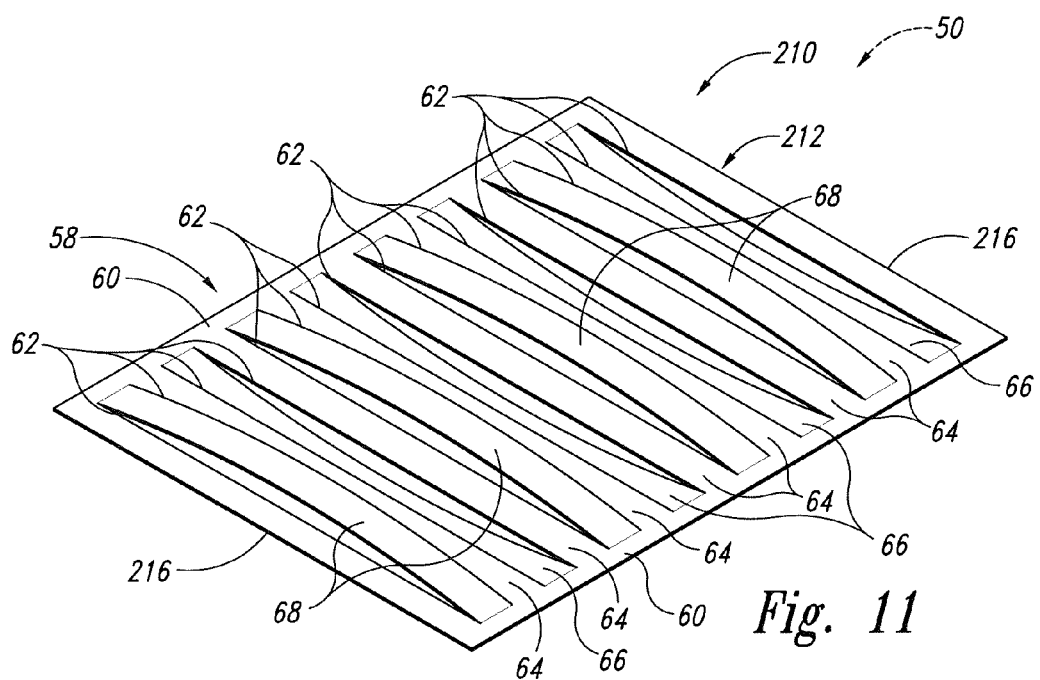
FIG. 11 is an isometric view of a cut sheet metal blank that may be used to form an illustrative, non-exclusive example of a bushing according to the present disclosure.
Figure 12:
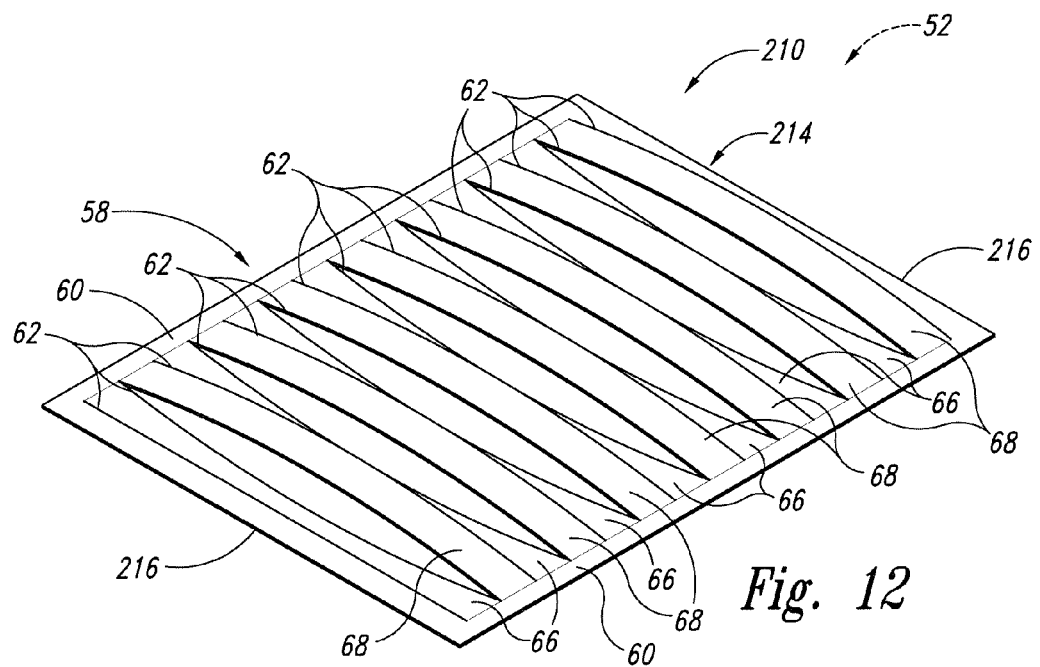
FIG. 12 is an isometric view of a cut sheet metal blank that may be used to form an illustrative, non-exclusive example of a bushing according to the present disclosure.

FIGS. 11-13 illustrate examples of blanks 210 that have had spring elements 58 formed therein. More specifically, FIG. 11 illustrates a blank 212 that corresponds to a bushing 50 according to the present disclosure, FIG. 12 illustrates a blank 214 that corresponds to a bushing 52 according to the present disclosure, and FIG. 13 illustrates a blank 215 that corresponds to a bushing 53 according to the present disclosure.

In some methods 200, the forming 202 may include cutting a plurality of spaced apart longitudinal slits 62 in the blank 210. In some such methods 200, the forming 202 also may include deforming strips of material between adjacent pairs of the plurality of spaced apart longitudinal slits 62 in a radial direction to form the plurality of spring elements 58. In some such methods 200, the deforming further includes bending a first subset of the strips in a first direction away from a plane defined by the blank 210 (for example, to define what will become radially inwardly extending spring elements 66) and bending a second subset of the strips in a second direction away from the plane defined by the blank 210 (for example, to define what will become radially outwardly extending spring elements 68), with the second direction being opposite the first direction. In some such methods, following the deforming, the first subset of the strips and the second subset of the strips alternate laterally across the blank 210.

In some methods 200, following the forming 202, the spring elements 58 are spaced apart from each other laterally across the blank 210, such as corresponding to a bushing 50 or a bushing 53 according to the present disclosure.

In some methods 200, the forming 202 may include die cutting the blank 210. In some methods 200, the blank 210 may be a rectangular, planar portion of sheet metal.

In some methods 200, the wrapping 204 may include wrapping the blank around a mandrel or other form, to form the tubular body 54. In some methods 200, the wrapping 204 defines a seam 70 between opposed edges 216 of the blank 210. In some such methods 200, following the wrapping 204, the edges 216 may be joined at the seam 70, such as by optionally brazing and/or crimping the edges 216 together.

FIG. 14 provides a flowchart that represents illustrative, non-exclusive examples of methods 220 of manufacturing bushings 16 according to the present disclosure. The methods and steps illustrated in FIG. 14 are not limiting and other methods and steps are within the scope of the present disclosure, including methods having greater than or fewer than the number of steps illustrated, as understood from the discussions herein.

As schematically illustrated in FIG. 14, methods 220 include cutting a length of tubing, as schematically indicated at 222, and following the cutting 222, forming a plurality of spring elements 58 in the cut length of tubing, as schematically indicated at 224. As schematically and optionally illustrated in dashed boxed in FIG. 14, following the forming 224, some methods 220 additionally may include heat treating the tubular body 54, as schematically indicated at 226, and plating the tubular body 54, as schematically indicated at 228.

In some methods 220, the forming 222 may include cutting a plurality of spaced apart longitudinal slits 62 in the cut length of tubing. In some such methods 220, the forming 222 also may include deforming strips of material between adjacent pairs of the plurality of spaced apart longitudinal slits 62 in a radial direction to form the plurality of spring elements 58. In some such methods 220, the deforming further includes bending a first subset of the strips in a first radial direction (for example, to define radially inwardly extending spring elements 66) and bending a second subset of the strips in a second and opposite radial direction away (for example, to define radially outwardly extending spring elements 68). In some such methods 220, following the deforming, the first subset of the strips and the second subset of the strips alternate circumferentially around the tubular body 54.

In some methods 220, the forming 222 may include positioning the cut length of tubing over a cylindrical mandrel that has sharp-edged slots formed into it and extending longitudinally along the cylindrical mandrel. Then, cutting dies (for example, shaped similar to woodruff keys) may be forced radially inwardly along the sharp-edged slots, thereby cutting and plastically deforming radially inwardly extending spring elements 66 into the cut length of tubing. Additionally or alternatively, the forming 222 may include positioning the cut length of tubing inside of a hollow mandrel that has sharp edged slots formed into and extending longitudinally along the hollow mandrel. Then, cutting dies (for example, shaped similar to woodruff keys) may be forced radially outwardly along the sharp-edged slots, thereby cutting and plastically deforming radially outwardly extending spring elements 68 into the cut length of tubing.

Illustrative, non-exclusive examples of inventive subject matter according to the present disclosure are described in the following enumerated paragraphs:

A bushing, comprising:

a tubular body that defines a through-bore for receiving a fastener for mounting a component to an object, wherein the tubular body includes end regions and a plurality of spring elements spaced circumferentially around the tubular body and extending longitudinally along the tubular body between the end regions.

A1. The bushing of paragraph A, wherein the end regions are flared radially outward.

A2. The bushing of any of paragraphs A-A1, wherein the spring elements are spaced apart from each other circumferentially around the tubular body.

A3. The bushing of any of paragraphs A-A2, wherein the spring elements extend parallel to a longitudinal axis of the tubular body.

A4. The bushing of any of paragraphs A-A2, wherein the spring elements extend at an angle relative to a longitudinal axis of the tubular body.

A5. The bushing of any of paragraphs A-A4, wherein the plurality of spring elements includes a plurality of radially inwardly extending spring elements.

A5.1 The bushing of paragraph A5, wherein the radially inwardly extending spring elements bow radially inwardly.

A5.2 The bushing of any of paragraphs A5-A5.1, wherein the radially inwardly extending spring elements are concave with respect to an outer side of the bushing.

A6. The bushing of any of paragraphs A-A5.2, wherein the plurality of spring elements includes a plurality of radially outwardly extending spring elements.

A6.1 The bushing of paragraph A6, wherein the radially outwardly extending spring elements bow radially outwardly.

A6.2 The bushing of any of paragraphs A6-A6.1, wherein the radially outwardly extending spring elements are convex with respect to an outer side of the bushing.

A7. The bushing of any of paragraphs A-A6.2, wherein the plurality of spring elements includes a subset of radially inwardly extending spring elements and a subset of radially outwardly extending spring elements.

A7.1 The bushing of paragraph A7, wherein the radially inwardly extending spring elements and the radially outwardly extending spring elements alternate circumferentially around the tubular body.

A8. The bushing of any of paragraphs A-A7.1, wherein the tubular body defines a plurality of longitudinal slits spaced apart circumferentially around the tubular body, and wherein adjacent pairs of slits define the plurality of spring elements.

A9. The bushing of any of paragraphs A-A8, wherein the spring elements are leaf springs.

A10. The bushing of any of paragraphs A-A9, wherein the tubular body is constructed of a single monolithic piece of material.

A11. The bushing of any of paragraphs A-A10, wherein the tubular body defines a longitudinal seam.

A11.1 The bushing of paragraph A11, wherein the seam is not joined together.

A11.2 The bushing of paragraph A11, wherein the seam is joined together, optionally brazed together, and optionally crimped together.

A12. The bushing of any of paragraphs A-A11.2, wherein each end region extends for less than 30, 20, 10, or 5% of an overall length of the bushing.

A13. The bushing of any of paragraphs A-A12, wherein the spring elements are defined by strips that are contiguous with the end regions and that are not contiguous with circumferentially adjacent portions of the tubular body.

A14. The bushing of any of paragraphs A-A13, wherein the tubular body is constructed of one of brass alloy and copper alloy, optionally of beryllium copper.

A15. The bushing of any of paragraphs A-A14, wherein the tubular body is plated, optionally gold plated, optionally nickel plated, and optionally zinc plated.

A16. The bushing of any of paragraphs A-A15, wherein the tubular body is constructed of electrically conductive material, and optionally of material that has a conductivity of at least $1 \times 10^6$ Siemens per meter.

A17. The bushing of any of paragraphs A-A16,
wherein when no longitudinal compressive force is applied to the bushing, the bushing has an uncompressed length; and
wherein when a longitudinal compressive force is applied to the bushing, the bushing has a compressed length that is less than the uncompressed length.

A17.1 The bushing of paragraph A17, wherein the longitudinal compressive force is an installation force associated with fastening the component to the object.

A18. The bushing of any of paragraphs A-A17.1 in combination with the component, the object, and a fastener for mounting the component to the object;
wherein the bushing is positioned within a mounting hole defined by the object;
wherein the fastener extends through the through-bore of the tubular body;
wherein the component is operatively fastened to the object; and
wherein the bushing is compressed longitudinally by the fastener.

A18.1 The combination of paragraph A18, wherein the object includes a tank for holding liquid, optionally a fuel tank, and optionally a fuel tank of an aircraft.

A18.2 The combination of any of paragraphs A18-A18.1, wherein the object is constructed of fiber reinforced composite material.

A18.3 The combination of any of paragraphs A18-A18.2, wherein the component is configured to carry an electrical charge, and wherein the bushing provides an electric current flow path between the component and the object.

A18.4 The combination of any of paragraphs A18-A18.3, wherein the component includes a hydraulic line, and optionally a bulkhead isolator for a hydraulic line.

A18.5 An aircraft including the combination of any of paragraphs A18-A18.4.

B. A method, comprising:
positioning the bushing of any of paragraphs A-A17.1 in a mounting hole of an object to which a component is to be mounted;
positioning the component relative to the object to which the component is to be mounted;
positioning a fastener through the mounting hole and the through-bore of the bushing; and
fastening the component to the object.

B1. The method of paragraph B, wherein the fastening includes longitudinally compressing the bushing.

B1.1 The method of paragraph B2, wherein prior to the fastening, the bushing has a length that is greater than a length of the mounting hole.

B1.1.1 The method of paragraph B1.1, wherein following the fastening, the length of the bushing is equal to, or is approximately equal to, the length of the mounting hole.

B2. The method of any of paragraphs B-B1.1.1, wherein the fastening includes radially expanding outwardly a subset of the plurality of spring elements into operative (optionally conductive) engagement with the mounting hole of the object.

B3. The method of any of paragraphs B-B2, wherein the fastening includes radially expanding inwardly a subset of the plurality of spring elements into operative (optionally conductive) engagement with the fastener.

B4. The method of any of paragraphs B-B3, wherein following the fastening, the fastener is grounded electrically to the object through the bushing.

B5. The method of any of paragraphs B-B4, wherein following the fastening, the component is grounded electrically to the object through the fastener and the bushing.

B6. The method of any of paragraphs B-B5, wherein following the fastening, the interface between the bushing and the fastener and the interface between the bushing and the object are configured to prevent sparking between the fastener, the bushing, and the object when the fastener carries an electrical charge.

B7. The method of any of paragraphs B-B6, wherein following the fastening, the interface between the bushing and the fastener and the interface between the bushing and the object are substantially free of voids.

B8. The method of any of paragraphs B-B7, wherein the object includes a tank for holding liquid, optionally a fuel tank, and optionally a fuel tank of an aircraft.

B9. The method of any of paragraphs B-B8, wherein the object is constructed of fiber reinforced composite material.

B10. The method of any of paragraphs B-B9, wherein the component is configured to carry an electrical charge, and wherein the bushing is configured to ground the component to the object.

B11. The method of any of paragraphs B-B10, wherein the component includes a bulkhead isolator for a hydraulic line.

B12. The method of any of paragraphs B-B11, wherein the component and object are associated with an aircraft.

B13. The method of any of paragraphs B-B12, preceded by the method of any of paragraphs C-5.

C. A method of manufacturing a bushing, comprising:
  forming a plurality of spring elements in a blank of material (optionally a rectangular blank of material); and
  following the forming, wrapping the blank to form a tubular body.

C1. The method of paragraph C, wherein the forming includes cutting a plurality of spaced apart longitudinal slits in the blank.

C1.1 The method of paragraph C1, wherein the forming includes deforming strips of material between adjacent pairs of the plurality of spaced apart longitudinal slits in a radial direction to form the plurality of spring elements.

C1.1.1 The method of paragraph C1.1, wherein the deforming includes bending a first subset of the strips in a first direction away from a plane defined by the blank and bending a second subset of the strips in a second direction away from the plane defined by the blank, wherein the second direction is opposite the first direction.

C1.1.1.1 The method of paragraph C1.1.1, wherein following the deforming, the first subset of the strips and the second subset of the strips alternate laterally across the blank.

C2. The method of any of paragraphs C-C1.1.1.1, wherein following the forming, the spring elements are spaced apart from each other laterally across the blank.

C3. The method of any of paragraphs C-C2, further comprising: following the wrapping, heat treating the tubular body.

C4. The method of any of paragraphs C-C3, wherein the wrapping defines a seam between edges of the blank, and wherein the method further comprises:
  following the wrapping, joining the edges at the seam, wherein the joining optionally includes one or more of brazing or crimping.

C5. The method of any of paragraphs C-C4, wherein the method results in the bushing of any of paragraphs A-A17.1.

D. A method of manufacturing a bushing, comprising:
  cutting a length of tubing to have a tubular body; and
  following the cutting, forming a plurality of spring elements in the tubular body;

D1. The method of paragraph D, wherein the forming includes cutting a plurality of spaced-apart longitudinal slits in the tubular body.

D1.1 The method of paragraph D1, wherein the forming includes deforming strips of material between adjacent pairs of the plurality of spaced apart longitudinal slits in a radial direction to form the plurality of spring elements.

D1.1.1 The method of paragraph D1.1, wherein the deforming includes bending a first subset of the strips in a first radial direction and bending a second subset of the strips in a second and opposite radial direction.

D1.1.1.1 The method of paragraph D1.1.1, wherein following the deforming, the first subset of the strips and the second subset of the strips alternate circumferentially around the tubular body.

D2. The method of any of paragraphs D-D1.1.1.1, wherein following the forming, the spring elements are spaced apart from each other circumferentially around the tubular body.

D3. The method of any of paragraphs D-D2, further comprising:
  following the forming, heat treating the tubular body.

D4. The method of any of paragraphs D-D3, wherein the method results in the bushing of any of paragraphs A-A17.1.

As used herein, a "fiber reinforced composite material" should be understood to include at least an epoxy or other polymer or binding material together with fibers, such as (but not limited to) carbon fibers, boron fibers, para-aramid (e.g., Kevlar®) fibers, and/or other fibers. Fiber reinforced composite materials additionally or alternatively may be described as or referred to as fiber reinforced polymers, or plastics.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft assembly, comprising:
  an aircraft fuel tank constructed of fiber reinforced composite material, wherein the aircraft fuel tank includes a wall that defines a mounting hole;
  a hydraulic line capable of carrying electrical charges, wherein the hydraulic line extends through the wall of the aircraft fuel tank;

a mounting structure for mounting the hydraulic line through the wall of the aircraft fuel tank;
a bushing positioned in the mounting hole, wherein the bushing comprises:
  a tubular body that defines a through-bore, wherein the tubular body is constructed of electrically conductive material that has a conductivity of at least $1 \times 10^6$ Siemens per meter, and wherein the tubular body includes:
    end regions, wherein each end region extends for less than 30% of an overall length of the bushing; and
    a plurality of spring elements spaced circumferentially around the tubular body and extending longitudinally along the tubular body between the end regions, wherein the spring elements are defined by strips that are contiguous with the end regions and that are not contiguous with circumferentially adjacent portions of the tubular body, and wherein the plurality of spring elements includes a subset of radially inwardly extending spring elements and a subset of radially outwardly extending spring elements, and wherein the radially inwardly extending spring elements and the radially outwardly extending spring elements alternate circumferentially around the tubular body; and
a fastener extending through the through-bore of the bushing, wherein the fastener longitudinally compresses the bushing so that the subset of radially inwardly extending spring elements impart inward radial pressure on the fastener and so that the subset of radially outwardly extending spring elements impart outward radial pressure on the wall of the aircraft fuel tank;
wherein the bushing provides an electric current flow path between the aircraft fuel tank and the hydraulic line to prevent sparking between the fastener and the aircraft fuel tank during a lightning strike on an aircraft associated with the aircraft assembly.

2. An aircraft assembly, comprising:
an aircraft structure constructed of fiber reinforced composite material, wherein the aircraft structure includes a wall that defines a mounting hole;
an aircraft component capable of carrying electrical charges, wherein the aircraft component extends through the wall of the aircraft structure;
a mounting structure for mounting the aircraft component through the wall of the aircraft structure;
a bushing positioned in the mounting hole, wherein the bushing comprises a tubular body that defines a through-bore, wherein the tubular body includes end regions and a plurality of spring elements spaced circumferentially around the tubular body and extending longitudinally along the tubular body between the end regions; and
a fastener extending through the through-bore of the bushing, wherein the fastener longitudinally compresses the bushing so that the plurality of spring elements impart radial pressure on the fastener and the wall;
wherein the bushing provides an electric current flow path between the aircraft component and the aircraft structure to prevent sparking between the fastener and the aircraft structure.

3. The aircraft assembly of claim 2, wherein the tubular body includes end regions that are flared radially outward.

4. The aircraft assembly of claim 2, wherein spring elements are spaced apart from each other circumferentially around the tubular body.

5. The aircraft assembly of claim 2, wherein the plurality of spring elements includes a plurality of radially inwardly extending spring elements.

6. The aircraft assembly of claim 2, wherein the plurality of spring elements includes a plurality of radially outwardly extending spring elements.

7. The aircraft assembly of claim 2, wherein the plurality of spring elements includes a subset of radially inwardly extending spring elements and a subset of radially outwardly extending spring elements.

8. The aircraft assembly of claim 7, wherein the radially inwardly extending spring elements and the radially outwardly extending spring elements alternate circumferentially around the tubular body.

9. The aircraft assembly of claim 2, wherein the tubular body defines a plurality of longitudinal slits spaced apart circumferentially around the tubular body, and wherein adjacent pairs of slits define the plurality of spring elements.

10. The aircraft assembly of claim 2, wherein the spring elements are leaf springs.

11. The aircraft assembly of claim 2, wherein the tubular body is constructed of a single monolithic piece of material.

12. The aircraft assembly of claim 2, wherein the tubular body defines a longitudinal seam that is not joined together.

13. The aircraft assembly of claim 2, wherein each end region extends for less than 30% of an overall length of the bushing.

14. The aircraft assembly of claim 2, wherein the spring elements are defined by strips that are contiguous with the end regions and that are not contiguous with circumferentially adjacent portions of the tubular body.

15. The aircraft assembly of claim 2, wherein the tubular body is constructed of electrically conductive material that has a conductivity of at least $1 \times 10^6$ Siemens per meter.

16. The aircraft assembly of claim 2,
  wherein when a longitudinal compressive force is applied to the bushing, the bushing has a compressed length that is less than an uncompressed length.

17. The aircraft assembly of claim 2, wherein the aircraft structure includes a fuel tank, and wherein the aircraft component includes a hydraulic line.

18. A method of assembling the aircraft assembly of claim 2, comprising:
  positioning the bushing in the mounting hole of the aircraft structure;
  positioning the aircraft component relative to the aircraft structure so that it extends through the wall of the aircraft structure;
  positioning the fastener through the mounting hole and the through-bore of the bushing; and
  fastening the aircraft component to the aircraft structure, wherein the fastening includes longitudinally compressing the bushing.

* * * * *